United States Patent [19]
Weiss

[11] 3,910,148
[45] Oct. 7, 1975

[54] SAFETY SAW CHAIN
[75] Inventor: Werner Weiss, Burlington, Canada
[73] Assignee: Sabre Saw Chain (1963) Ltd., Burlington, Canada
[22] Filed: July 25, 1973
[21] Appl. No.: 382,547

[30] Foreign Application Priority Data
Aug. 17, 1972 Canada.................................. 149610

[52] U.S. Cl..................................... 83/833; 83/834
[51] Int. Cl.² ......................................... B27B 33/14
[58] Field of Search ............. 83/834, 833, 830, 832

[56] References Cited
UNITED STATES PATENTS
| | | | |
|---|---|---|---|
| 2,897,857 | 8/1959 | Carlton | 83/834 |
| 2,928,440 | 3/1960 | Fors | 83/834 |
| 2,930,417 | 3/1960 | Consoletti | 83/834 |
| 3,180,378 | 4/1965 | Carlton | 83/834 |
| 3,329,183 | 7/1967 | Robinson | 83/834 |

*Primary Examiner*—Donald R. Schran
*Attorney, Agent, or Firm*—Schuyler, Birch, Swindler, McKie & Beckett

[57] ABSTRACT

This invention provides a saw chain construction in which a safety link is provided to ensure that extraneous materials are not trapped between sequentially adjacent cutting teeth. The basic structure of the saw chain includes sequential center links and pairs of side links joining the center links. Some of the pairs of side links include cutter links, such that successive cutter links are on opposite sides of the chain. A depth gauge is provided on a link of the chain disposed ahead of each cutter tooth in the direction of chain movement, and a safety link is provided ahead of each cutter tooth, the safety link constituting one of the side links of the pair immediately preceding that cutter link, and having an upstanding, sloping cam portion which terminates adjacent the depth gauge.

12 Claims, 5 Drawing Figures

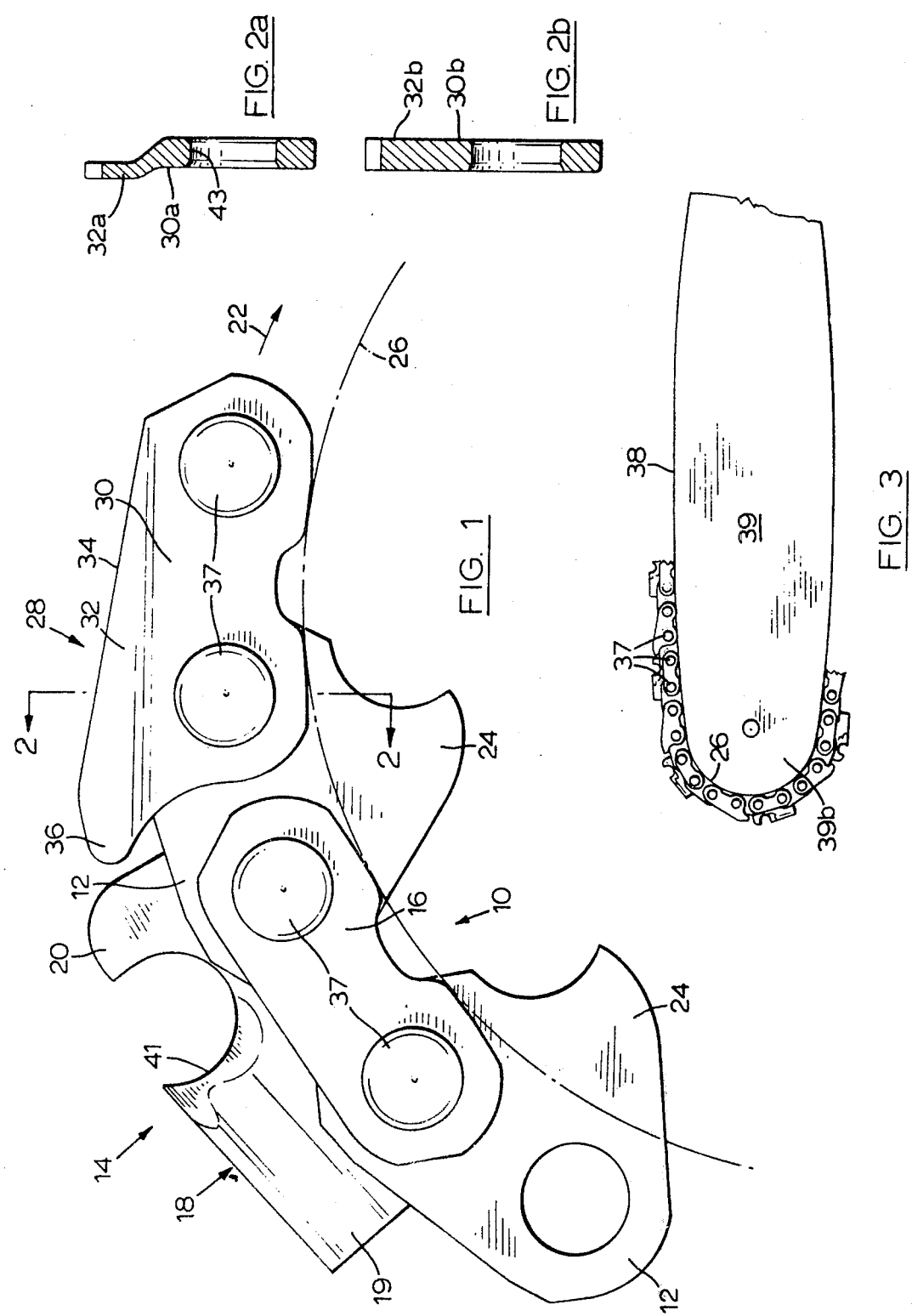

SAFETY SAW CHAIN

This invention relates generally to power saw chains adapted for cutting wood, and has to do particularly with the specific design of one of the links of the saw chain. Priority is claimed for this application based on Canadian application, Ser. No. 149,610 filed Aug. 17, 1972.

BACKGROUND OF THE INVENTION:

Numerous saw chain designs have been evolved in the past, and are the subject of a number of patents in this field. A typical example of the general prior art is U.S. Pat. No. 2,508,784, Cox, issued May 23, 1950 and entitled "Power Saw Chain." Cox discloses one of the standard link arrangements for power saw chains, one which includes a series of sequential center links, and pairs of oppositely disposed side links joining adjacent center links. Alternate ones of the pairs of side links include a cutter link as one of the side links, and the successive cutter links are disposed on opposite sides of the power saw chain. Each cutter link usually includes a preceding depth gauge portion, and a following cutter tooth, the function of the depth gauge portion being to limit the "bite" of the cutter tooth and thus avoid binding or stalling. The center links usually have sprocket-engaging portions extending in the opposite direction from the cutter tooth, and these sprocket-engaging portions are adapted to receive the driving force which moves the saw chain along and around a saw bar.

Some recent developments in the design of power saw chains are worth mentioning. In U.S. Pat. No. 3,180,378, issued to R. R. Carlton on Apr. 27, 1965, and entitled "Brush Cutting Chain," the inventor discloses a slight alteration in the standard saw chain disclosed in the Cox patent. The purpose of this modification is to prevent brush, wood chips, etc. from becoming caught between adjacent cutter links, thus fouling the operation of the chain. The modification disclosed by Carlton which has been somewhat successful is to provide, on the side link immediately preceding and aligned with each cutter tooth, a raised brush-clearing portion having a suitable cam surface adapted to cam out of the way bits of wood chips, brush, etc.

While the goal aimed at by Carlton is acknowledged to be desirable, i.e., that of ensuring that brush and wood chips do not become lodged between adjacent cutter teeth, nonetheless the construction taught in the Carlton patent has several basic disadvantages which it is the object of this invention to overcome.

One of the disadvantages relates to the fact that Carlton teaches the provision of the brush-clearing link on the same side of the chain as the following cutter link. This leads inevitably to a specific amount of imbalance in the saw chain. The imbalance is produced in two distinct ways. The first form of imbalance arises when the saw chain is moving in a circular path around the bar nose of a power saw. The natural centrifugal force of the heavier cutter link and its associated brush-clearing link, since these are both located on the same side of the saw chain, would tend to twist that particular portion of the saw chain in one direction, while the next succeeding cutter link and its associated brush-clearing link will tend to produce a twist in the opposite direction. Of course, where every other pair of side links includes a cutter link, the same centrifugal imbalance and same opposite twisting moments would arise regardless to which side of the chain the brush-clearing link is on, provided of course that the brush-clearing link has its center of gravity midway between the two adjacent cutter links. Carlton, however, discloses, among other types, a brush-clearing link whose center of gravity is displaced in the direction toward the following cutter link, and the placing of these two on the same side of the saw chain inevitably leads to the kind of alternating twisting moments described above as the chain passes along the bar, and around the bar nose in particular.

The other form of imbalance occurs as each cutter tooth bites into the wood being cut. Naturally, as the cutter tooth is biting into the wood, there is a strong rearward drag transmitted to the saw chain, the force of this drag being off-center because the cutter tooth itself is a side link. Where the brush-clearing link is disposed on the same side of the chain as its following cutter link, as disclosed by Carlton, any frictional drag on the brush-clearing link will also be transmitted to the chain on the same side as the force being transmitted by the following cutter link.

A further disadvantage of the Carlton arrangements wherein each brush-clearing link is on the same side as the following cutter link shows up particularly where the chain is moving in a circular path around the bar nose. As the chain curves away from the side to which the cutter tooth and the brush-clearing portion project, the depth gauge of the cutter tooth and the brush-clearing portion of the intermediate tooth swivel or pivot away from each other, thus widening the gap between them, making boring applications extremely hazardous.

It is an object of this invention to overcome the particular disadvantages of the prior art set out above.

SUMMARY OF THE INVENTION

Accordingly, this invention provides, in a saw chain having a plurality of sequential center links and pairs of oppositely disposed side links joining adjacent center links, a cutter link constituting one of a pair of side links and incorporating an upstanding cutter tooth, a depth gauge integral with a link of the chain and disposed ahead of the cutter tooth in the direction of chain movement, and a safety link constituting one of the side links of the pair immediately preceding said cutter link, the safety link being disposed on the other side of the chain from said cutter link and immediately preceding said depth gauge, the safety link having an upstanding cam portion extending in the same direction as the cutting tooth and sloping upwardly and rearwardly, the cam portion terminating adjacent said depth gauge.

BRIEF DESCRIPTION OF THE DRAWINGS

Two embodiments of this invention are illustrated in the accompanying drawings, wherein like numerals denote like parts throughout the several views, and in which:

FIG. 1 is an elevational view of a power saw chain incorporating the first embodiment of this invention;

FIGS. 2A and 2B are sectional views of two variants of the safety link of this invention, taken along the line 2—2 in FIG. 1;

FIG. 3 shows a chain mounted on a saw bar; and

DETAIL DESCRIPTION OF THE PREFERRED EMBODIMENTS

Figure 4:
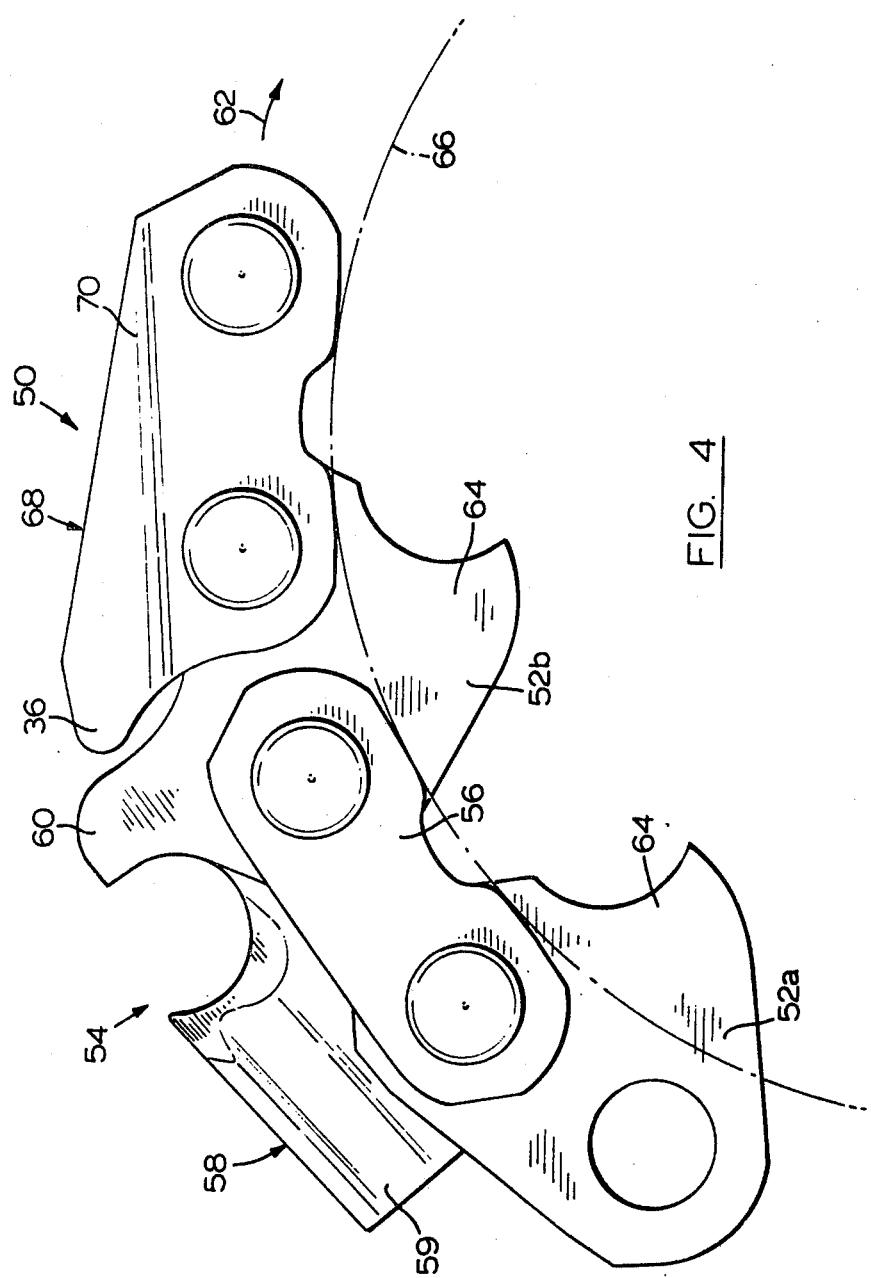
FIG. 4 is an elevational view of a power saw chain incorporating the second embodiment of this invention.

Turning to FIG. 1, the power saw chain shown generally at 10 is seen to include a plurality of sequential center links 12, and pairs of oppositely disposed side links joining sequential center links 12. A first pair of side links is shown at 14, and includes a tie link 16 on the near side of the chain as viewed in FIG. 1, and a cutter link 18 on the far side of the chain as viewed in FIG. 1. The cutter link incorporates a cutter tooth 19 extending upwardly from the chain as seen in FIG. 1, and a preceding depth gauge 20 which is situated ahead of the cutter tooth 18 in the direction of travel, shown by the arrow 22. Each center link 12 has a sprocket-engaging portion 24 extending downwardly for inwardly with respect to the saw chain 10. Such links are also referred to as drivelinks. As seen in FIG. 1, the saw chain is following a circular locus 26, which is defined by the bar nose of the power saw. None of the chain-engaging parts of the power saw drive are shown in FIG. 1.

FIG. 1 also shows a pair of side links 28 which includes one tie link 16 not visible in FIG. 1 because it is on the far side of the saw chain, and one safety link 30 on the near side of the saw chain.

The safety link 30 shown in FIG. 1 represents the side view of both variants of the safety link, because the side views of the two variants are the same. Both variants of the safety link 30 include an upstanding cam portion 32 which has an upwardly and rearwardly sloping edge or surface 34, and which is adapted to cam out of the way bits of brush, chips, small branches, etc. which may have a tendency to become lodged between successive cutter teeth, resulting in the commonly known "kickback" which endangers the saw operator. The cam portion 32 has a rearwardly projecting nose 36 which terminates adjacent the depth gauge 20 when the chain is straightened out. FIG. 3 shows that the rivets 37 connecting the various links together are substantially rectilinearly guided along the approximately straight edges 38 of saw bar 39. When the links lie thus in a straight line, the safety link 30 and the cutter link 18 are arranged with the nose 36 in an overlapping position with respect to the depth gauge 20. It is only when the chain is pivoting around a narrow bar nose such as the bar nose 39b along the circular locus 26 that a very slight gap between the nose 36 and the depth gauge 20 is established. Even so, the gap between these parts is extremely small, and indeed need not be there at all. In other words, it is possible to have the nose 36 extend even further to the left in FIG. 1, so that it remains at all times in an overlapping relation with the depth gauge 20 of the cutter link 18. As can be seen from the drawings, the height of the cam portion 32 is somewhat less than the height of the depth gauge member 20. Satisfactory operation is obtained when the height of the cam portion is between one-half of the height of the depth gauge member and substantially equal to the height of the depth gauge member.

It will be appreciated that, in the first embodiment shown in FIG. 1, the safety link 30 must be mounted on the opposite side of the saw chain 10 from the cutter link 18, in order to permit a laterally overlapping relation between the nose 36 and the depth gauge 20 when the chain is straightened out. Moreover, the positioning of the safety link 30 on the opposite side of the chain 10 from the cutter link 18, in combination with the provision of the rearwardly extending nose 36 at the end of the cam portion 32 has the effect of shifting the center of gravity of the safety link 30 decidedly to the rear (leftwardly in FIG. 1), and this arrangement helps balance the tendency for centrifugal torque to be exerted on the cutters and on the saw chain as the saw chain passes around the bar nose 39b.

Furthermore, the positioning of the safety link 30 on the opposite side of the chain 10 from the cutter link 18 promotes the very smooth, vibration-free running of the saw chain because the safety link 30 does not drag against the cut wood in response to the jerk exerted on the chain as the cutting edge 41 of the cutter link 18 bites into the wood. To clarify this point, imagine that the safety link 30 were provided on the same side of the chain as the following cutter link 18. Then, as the cutting edge 41 of the cutter link 18 entered the wood, it would cause a strong rearward jerk on the saw chain 10, the jerk being applied off-center because the cutting edge 41 if off-center with respect to the chain. The rearward jerk would tend to force the preceding safety link against the side of the kerf and this would increase frictional drag. By contrasts the positioning of the safety link 30 on the opposite side from the following cutter link 18, as is the case in the present safety chain construction, results in the safety link 30 being urged away from the side of the kerf when the following cutter link bites into the wood. It will be understood that both the following and the preceding cutter link, where these are on opposite sides of the chain, will tend to move the intermediate safety link 30 shown in FIG. 1 away from the kerf and therefore to reduce frictional drag.

Attention is now directed to FIG. 2A, which shows the profile of the first variant of the safety link of this invention. It will be seen in FIG. 2A that the cam portion 32a has a laterally outward offset. In other words, the upwardly projecting cam portion 32a is offset laterally with respect to the body portion of the safety link in the direction away from the cutter link 18, which is to say toward the viewer looking at FIG. 1. The safety link 30a is provided with two pin bores 43, of which one is visible in the sectional view of FIG. 2A. Each pin bore 43 is counter-sunk on either side, as is usual in saw chain side links. The two pin bores 43 are adapted to receive rivets 38, as is conventional in saw chain construction. The offset in the cam portion 32 of the first variant of the safety link provides somewhat greater room adjacent the saw chain between cutter links for carrying the shavings which result from the action of the cutting edge 41 of the cutter link 18. These shavings are to be distinguished from the bits of brush, chips, branches, etc. mentioned above. The latter are intended to be cammed out of the way by the cam portion 32, while the shavings are intended to be carried along beside the cam portion 32. It will also be noted in FIG. 2A that the offset section of the cam portion 32a is thinner or narrower than the remainder of the safety link 30a. This narrowness serves to increase the space beside the cam portion 32 for transporting the shavings out of the kerf.

Attention is now directed to FIG. 2B, in which the second variant of the safety link is illustrated. In FIG. 2B, the safety link 30b lacks any offset for the upstanding cam portion 32b, which instead is flat and has a substantially uniform thickness so that is merely extends straight upwardly from the main body of the safety link 30b. The second variant of the safety link of this invention, while not providing quite as much room adjacent the upstanding cam portion 32b for carrying shavings out of the kerf, nonetheless exhibits most of the other advantages inherent in the first variant described above.

In FIG. 4, the second embodiment of this invention is illustrated. In this embodiment, the power chain shown generally at 50 includes a plurality of sequential center links 52, and pairs of oppositely disposed side links joining sequential center links 52a, b. A first pair of side links is shown at 54, and includes a tie link 56 on the near side of the chain 10 as viewed in FIG. 4, and a cutter link 58 on the far side of the chain as viewed in FIG. 4. The cutter link 58 incorporates a cutter tooth 59 extending upwardly from the chain 10 as seen in FIG. 4, but does not include a depth gauge as did the cutter link 18 in the first embodiment of this invention shown in FIG. 1. Instead, a depth gauge 60 is provided as an integral part of the center link 52b immediately preceding the cutter link 58 in the direction of travel, shown by the arrow 62. Each center link 52a, b has a sprocket-engaging portion 64 extending downwardly or inwardly with respect to the saw chain 50. As shown in FIG. 4, the saw chain 50 follows a circular locus 66, which is defined by the bar nose of the power saw. None of the chain-engaging parts of the power saw drive are shown in FIG. 4.

The second embodiment of the invention also includes a safety link 70 on the near side of the saw chain 50 as viewed in FIG. 4, the safety link 70 being one of a pair of side links 68 which also includes one tie link which is hidden in FIG. 4 because it is on the far side of the saw chain 50.

The safety link 70 in FIG. 4 is the same as the safety link 30 in FIG. 1, and can have either of the sectional configurations shown in FIGS. 2A and 2B.

It will now be appreciated that the only difference between the first embodiment and the second embodiment of this invention is the location of the depth gauge immediately preceding the cutter in the direction of travel of the saw chain. The depth gauge in the first embodiment is integral with the forward part of the cutter link, while the depth gauge in the second embodiment is integral with the immediately preceding center link. In both cases, the safety link is provided on the opposite side of the saw chain from the following cutter link, and in both cases the safety link is adapted to overlap the depth gauge when the chain is straightened out. To transpose the depth gauge from the cutter link to the immediately preceding center link does not alter the essential balance of the saw chain, and has no effect on the advantages derived from this balance.

Because of the balance imparted to the safety chain by the provision of the safety link of this invention, the operation of the chain is virtually free of the vibrational characteristics that are found with conventional saw chains. The safety link reduces the vibration because (a) it tends to balance the torque applied to the saw chain due to the centrifugal forces arising as the chain passes around the bar nose 39b, and (b) it is positioned in such a way that is drawn away from the side of the kerf by the twisting motion of the sequential cutter links as their cutting edges bite into the wood. In addition, as mentioned above, the rearwardly extending nose 36 of the cam portion 32, because it is in substantially overlapping relation with the depth gauge 20,60 when the chain is straightened out, has the effect of camming out of the way bits of brush, chips, small branches, etc. which may have a tendency to become lodged between adjacent cutter teeth.

Furthermore, the safety link disclosed in the present application can be applied to chain saws with various kinds of sprocket drives, without decreasing the anti-vibration effect of the safety link.

It is recognized that two further juxtapositions of the safety link disclosed herein are possible, these being 1) one in which the depth gauge is located on the center link preceding the cutter link and the safety link is on the same side of the saw chain as the following cutter link, and b) one in which the depth gauge is located on the side link which forms a pair with the cutter link, and the safety link is on the same side of the saw chain as the following cutter link. While both of these arrangements permit overlapping of the safety link and the depth gauge, they do not have the advantage of balancing the forces on the chain as described above in connection with the first and second embodiments, nor do they permit the safety link to be drawn away from the wall of the cut by the natural twist imparted to the cutter links as the cutting edges bite into the wood.

The foregoing description has been given merely for purposes of exemplification of the preferred embodiments. Since modifications of the invention will undoubtedly occur to those skilled in the art, the scope of the patent right is to be limited solely by the scope of the following claims:

I claim:

1. A safety saw chain comprising a plurality of center links and a plurality of pairs of side links pivotally joining said center links, certain of said pairs of side links being cutter pairs comprising a noncutting tie link on one side of the chain and a cutter link with an upstanding cutter portion on the opposite side of the chain; each cutter pair having associated therewith a depth gauge with a leading edge, said depth gauge being disposed ahead of the cutter portion integral with a link of the chain; wherein the pair of side links immediately preceding each cutter pair is a safety pair comprising a noncutting tie link on the same side of the chain as the following cutter link and a noncutting safety link on the opposite side of the chain from the following cutter link, each said safety link having a body portion and an upstanding cam portion having an upwardly and rearwardly sloping upper edge adapted to lift small diameter timber smoothly over the leading edge of said depth gauge; said cam portion terminating adjacent said depth gauge in a rearwardly projecting nose, said nose ending in a tip disposed in overlapping relationship laterally opposite the depth gauge when the chain is straight; the center of gravity of each safety link lying nearer to the center link following that safety link than to the center link preceding that safety link.

2. A saw chain as recited in claim 1 wherein the cam portion of the safety link is offset laterally with respect to the body portion of the safety link.

3. A saw chain as recited in claim 2 wherein the cam portion of the safety link is thinner than the body portion of the safety link.

4. A saw chain as recited in claim 1 wherein the height of the cam portion of the safety link is substantially equal to the height of the depth gauge.

5. A saw chain as recited in claim 1 wherein the height of the cam portion of the safety link is less than the height of the depth gauge.

6. A saw chain as recited in claim 1 wherein the safety link is flat and has uniform thickness.

7. A safety saw chain comprising a plurality of center links and a plurality of pairs of side links pivotally joining said center links, certain of said pairs of side links being cutter pairs comprising a non-cutting tie link on one side of the chain and a cutter link with an upstanding cutter portion on the opposite side of the chain; each cutter pair having associated therewith a depth gauge with a leading edge, said depth gauge being disposed ahead of the cutter portion integral with a link of the chain; wherein the pair of side links immediately preceding each cutter pair is a safety pair comprising a noncutting tie link on the same side of the chain as the following cutter link and a noncutting safety link on the opposite side of the chain from the following cutter link, each said safety link having a body portion and an upstanding cam portion terminating adjacent said depth gauge and having an upwardly and rearwardly sloping upper edge adapted to lift small diameter timber smoothly over the leading edge of said depth gauge; said cam portion being offset laterally outwardly with respect to the body portion of the safety link away from the cutting edge of the following cutter; the center of gravity of each safety link lying nearer to the center link following that safety link than to the center link preceding that safety link.

8. A saw chain as recited in claim 7 wherein the body portion of the safety link is flat and has uniform thickness, and the cam portion of the safety link is thinner than the body portion of the safety link.

9. A saw chain as recited in claim 7 wherein the height of the cam portion of the safety link is less than the height of the depth gauge.

10. A saw chain as recited in claim 7 wherein the cam portion terminates adjacent the depth gauge when the chain is straight.

11. A saw chain as recited in claim 10 wherein said upwardly and rearwardly sloping upper edge is disposed immediately forward of the rearmost pivot point of the safety link.

12. A saw chain as recited in claim 7 wherein the height of the cam portion of the safety link is substantially equal to the height of the depth gauge.

* * * * *